(12) United States Patent
Zhang et al.

(10) Patent No.: US 7,780,084 B2
(45) Date of Patent: Aug. 24, 2010

(54) 2-D BARCODE RECOGNITION

(75) Inventors: Chunhui Zhang, Beijing (CN);
Zhouchen Lin, Beijing (CN); Zhengyou Zhang, Redmond, WA (US); Shi Han, Beijing (CN)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 11/772,069

(22) Filed: Jun. 29, 2007

(65) Prior Publication Data

US 2009/0001165 A1 Jan. 1, 2009

(51) Int. Cl.
*G06K 7/10* (2006.01)
(52) U.S. Cl. .................................. 235/462.11
(58) Field of Classification Search .................. 235/454, 235/462.01, 462.08, 462.11, 462.24
See application file for complete search history.

(56) References Cited

U.S. PATENT DOCUMENTS

| 5,262,623 | A | * | 11/1993 | Batterman et al. | ........... 235/454 |
| 5,304,787 | A | * | 4/1994 | Wang | ................. 235/462.09 |
| 6,565,003 | B1 | | 5/2003 | Ma | |
| 6,604,682 | B2 | | 8/2003 | Wakamiya et al. | |
| 6,650,776 | B2 | | 11/2003 | Ihara et al. | |
| 7,137,555 | B2 | | 11/2006 | Bremer et al. | |
| 7,168,621 | B2 | * | 1/2007 | Ghai et al. | ............. 235/462.25 |
| 7,143,948 | B2 | | 10/2007 | Nakazawa et al. | |
| 7,337,970 | B2 | * | 3/2008 | Joseph et al. | ............. 235/462.1 |
| 2005/0199721 | A1 | | 9/2005 | Chang et al. | |
| 2006/0065733 | A1 | | 3/2006 | Lee et al. | |
| 2006/0164682 | A1 | | 7/2006 | Lev | |
| 2006/0202040 | A1 | | 9/2006 | Wang et al. | |

OTHER PUBLICATIONS

Normand, et al., "A Two-Dimensional Bar Code Reader", available at least as early as Jan. 25, 2007, at <<http://ieeexplore.ieee.org/iel2/4429/12532/00577158.pdf?isnumber=&arnumber=577158>>, IEEE, 1994, pp. 201-203.
Ohbuchi, et al., "Barcode Readers using the Camera Device in Mobile Phones", available at least as early as Jan. 25, 2007, at <<http://ieeexplore.ieee.org/iel5/9429/29917/01366183.pdf?isnumber=&arnumber=1366183>>, IEEE, pp. 1-5.
Oktem, et al., "A Superresolution Approach for Bar Code Reading", available at least as early as Jan. 25, 2007, at <<http://www.ee.bilkent.edu.tr/~signal/defevent/papers/cr1113.pdf>>, pp. 1-4.

* cited by examiner

*Primary Examiner*—Seung H Lee
(74) *Attorney, Agent, or Firm*—Lee & Hayes, PLLC

(57) ABSTRACT

Systems and methods for 2-D barcode recognition are described. In one aspect, the systems and methods use a charge coupled camera capturing device to capture a digital image of a 3-D scene. The systems and methods evaluate the digital image to localize and segment a 2-D barcode from the digital image of the 3-D scene. The 2-D barcode is rectified to remove non-uniform lighting and correct any perspective distortion. The rectified 2-D barcode is divided into multiple uniform cells to generate a 2-D matrix array of symbols. A barcode processing application evaluates the 2-D matrix array of symbols to present data to the user.

20 Claims, 9 Drawing Sheets

2-D BARCODE RECOGNITION

BACKGROUND

A barcode is a machine-readable visual representation of information. A 2 dimensional (2-D) barcode is similar to a linear 1 dimensional (1D) barcode, but has more data representation capability than the 1D barcode. There are a large variety of 2-D symbologies other than a sequence of bars that were used in early 1D bar-coding schemes. The most common 2-D symbologies are matrix codes, which feature square or dot-shaped modules arranged on a grid pattern 2-D symbologies cannot be read by a laser as there is typically no sweep pattern that can encompass the entire symbol. As a result, 2-D barcodes are generally scanned by a charge coupled camera capture devices (CCD devices) or a complementary metal-oxide-semiconductor sensor (CMOS cameras).

SUMMARY

Systems and methods for 2-D barcode recognition are described. In one aspect, the systems and methods use a charge coupled camera capturing device to capture a digital image of a 3-D scene. The systems and methods evaluate the digital image to localize and segment a 2-D barcode from the digital image of the 3-D scene. The 2-D barcode is rectified to remove non-uniform lighting and correct any perspective distortion. The rectified 2-D barcode is divided into multiple uniform cells to generate a 2-D matrix array of symbols. A barcode processing application evaluates the 2-D matrix array of symbols to present data to the user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure relates to methods and systems for generating a recognizable 2-D barcode symbol matrix from an image of a 2-D barcode. Automatic identification and evaluation of 2-D barcode in real world scenarios using an ordinary camera, a web camera, or a mobile phone camera has wide demands, but is difficult to achieve. This is because localization of the 2-D barcodes in images captured in the real world scenarios is complicated by factors such as illumination variation, rotation, perspective distortion and multiple barcodes.

The methods and systems provide for processing an input image of a 2-D barcode to compensate for illumination variations and to convert the input image into a binary image. The methods and systems then identify an area in the binary image as the 2-D barcode and warp the 2-D barcode from the binary image into an image of predetermined dimensions, such as a square image. The square image can be further rectified to generate the 2-D barcode symbol matrix. The 2-D barcode symbol matrix may be directly recognized by a symbol recognition module, or may be converted into a 2-D barcode data array and may be processed for presenting associated information to a user.

An Exemplary Computing Environment

Figure 1:
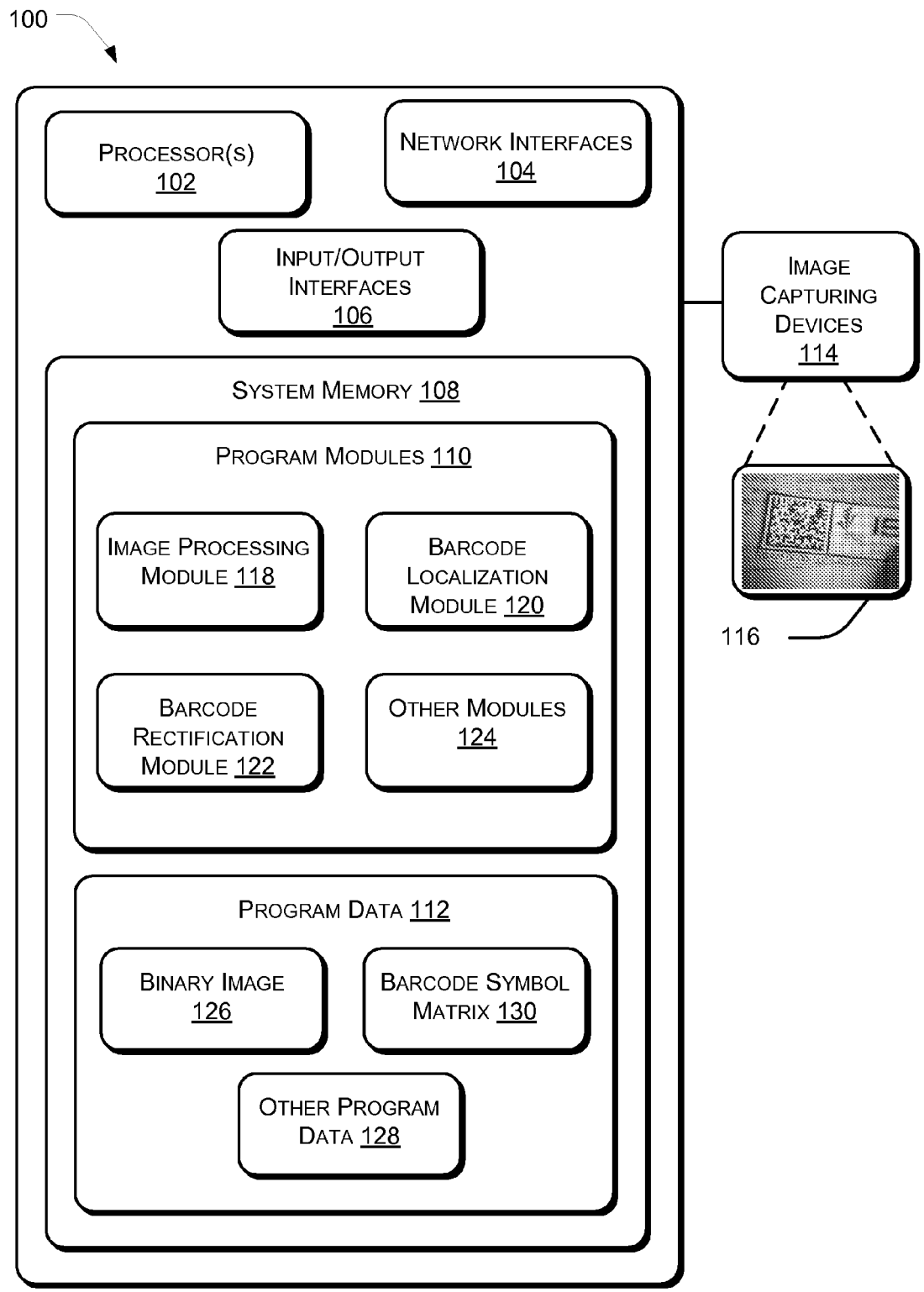
FIG. 1 illustrates an exemplary computing device for 2-D Barcode recognition.

FIG. 1 is an exemplary computing device 100 suitable for implementing 2-D Barcode recognition. The computing device 100 may be implemented as any of a variety of conventional computing devices, including, for example, a server, a desktop PC, a notebook or portable computer, a workstation, a mainframe computer, a mobile computing device, an entertainment device, an internet appliance, etc.

For discussion purposes, the computing device 100 includes a processor 102 coupled to network interfaces 104, input/output interfaces 106 and memory 108. The memory 108 can be any computer-readable media in the form of volatile memory, such as Random Access Memory (RAM) and/or non-volatile memory, such as Read Only Memory (ROM) or flash RAM. The memory 108 typically includes data and/or program modules for implementing 2-D barcode recognition that are immediately accessible to and/or presently operated on by the processor 102. In one implementation, the memory 108 includes program modules 110 and program data 112.

The computing device 100 can be associated with an image capturing device 114 either directly or over a network. The image capturing device 114 can be any known image capturing device, such as a CCD camera, a web camera, a camera associated with a phone, a scanner, etc. The image capturing device 114 can capture an image 116 of a 2-D barcode and send the image 116 to the computing device 100 for recognition.

The computing device 100 can convert the image 116 into a 2-D barcode symbol matrix that can be recognized by a symbol recognizer. The symbol recognizer may be a part of the computing device 100, or may be associated with the computing device 100 either directly or through a network.

In one embodiment, to convert the image 116 into the 2-D barcode symbol matrix, the program modules 110 include an image processing module 118, a barcode localization module 120, a barcode rectification module 122, and other modules 124. The image processing module 118 can receive the image 116 and convert the image 116 into a binary image 126. Towards this end, in one implementation, the image processing module 118 can convert the image 116 into a grayscale image using a relationship between a gray intensity of a pixel and red, blue, and green (RBG) intensity values of the pixel. For example, the image 116 can be converted into a grayscale image using the following equation:

$$I_{x,y} = 0.3 \times R_{x,y} + 0.59 \times G_{x,y} + 0.11 \times B_{x,y} \quad (1)$$

where, $I_{x,y}$ is the gray intensity of pixel P(x,y), while $R_{x,y}$, $G_{x,y}$, $B_{x,y}$ are the red, green and blue values of the pixel P(x,y). It will be understood that the conversion of the image 116 from color to grayscale can also be performed by other methods known in the art. In another implementation, the image 116 can be a grayscale image and therefore may be directly processed further, without conversion.

The image processing module 118 then uses illumination compensation techniques known in the art to modify lighting effects, such as to compensate for non-uniform lighting, remove shadows, regularize the range of image intensities, etc. For example, the image processing module 118 can model non-uniform lighting as an additive $2^{nd}$-order surface, which can be divided from the grayscale image to get a uniformly illuminated image. In another example, the image processing module 118 can stretch image intensities so that the image intensities lie between 0-255.

After the modification, the image processing module 118 converts the grayscale image into the binary image 126. In one implementation, the modified grayscale image can be divided into four parts. A segmentation threshold can be determined for each of the parts, which can be used to convert the respective part into a binary image. For example, within a part, the intensity of a pixel can be compared to the segmentation threshold for the part. If the intensity of the pixel is less than the segmentation threshold, the pixel can be represented as a black pixel. On the other hand, if the intensity of the pixel is more than the segmentation threshold, the pixel can be represented as a white pixel. Thus the gray scale image can be converted into a black and white (binary) image. It will be understood that other methods known in the art can also be used to convert the grayscale image into the binary image 126. The intermediate images generated during the transformation of the image 116 into the binary image 126, such as the grayscale image and the modified grayscale image, can be stored in other program data 128.

The binary image 126 is processed by the barcode localization module 120 to locate an area in the binary image 126 that corresponds to the 2-D barcode. Towards this end, the barcode localization module filters the binary image 126 to obtain a mask of edge points in the binary image 126 using one or more image filters. For example, the barcode localization module 120 can use a Robert filter known in the art to identify the edge points in the binary image 126.

The barcode localization module 120 then identifies a region in the mask as a coarse area that includes the 2-D barcode. For this, the barcode localization module uses a series of centre of gravity calculations, which is described later in detail with reference to FIG. 2a.

The barcode identification module 120 then detects a region in the coarse area that has the largest connected edge points as the 2-D barcodes' exterior quadrangle. Further, the barcode localization module computes the corners of the region by applying Hough transform to the exterior quadrangle. This is explained in detail later with reference to FIG. 2a. The barcode localization module 120 then locates points corresponding to the computed corners in the binary image 126. These points correspond to the corners of the 2-D barcode in the binary image 126.

Once the corners of the 2-D barcode have been identified, the barcode rectification module 122 warps the 2-D barcode into a warped image to correct any pose and/or perspective distortions. In one implementation, the warped image is a square image that includes two lines of connected black pixels forming a right angle at the left hand bottom corner of the image. The presence of the two lines can be used to verify that the 2-D barcode orientation has not undergone rotational changes. The barcode rectification module 122 then converts the warped image into a barcode symbol matrix 130 by dividing the warped image into cells and determining the number of black pixels in each cell. The working of the barcode rectification module 122 is described later in detail with reference to FIG. 2b.

The 2-D barcode symbol matrix 130 may be provided to a symbol recognition module for processing and can result in one or more arbitrary and useful applications. An exemplary such symbol recognition module can be stored in "other modules" 124. In another implementation, the symbol recognition module can be part of a symbol recognizer that is associated with the computing device 100 either directly or over a network. Some well-known uses of barcode symbol matrix information include, for example, identifying an item associated with the barcode for tracking, separation and indexing, and/or so on, to present associated information to a user.

Figure 2A:
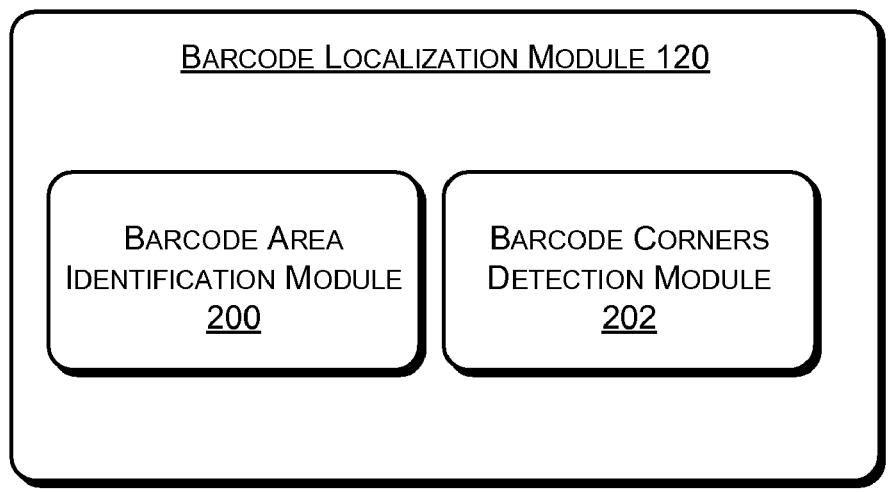
FIG. 2a illustrates an exemplary barcode localization module for locating the barcode area in an image.

FIG. 2a illustrates an exemplary barcode localization module for locating the barcode area in an image. The barcode localization module 120 includes a barcode area identification module 200 and a barcode corners detection module 202.

The barcode area identification module (area identification module) 200 receives the binary image 126 from the image processing module 118 and converts the binary image 126 into a mask using one or more image filters. In one implementation, the area identification module 200 uses a Robert filter to determine edge points from the binary image 126 to create the mask. The Robert filter computes a 2-D spatial gradient on the binary image 126 and represents pixel values at each pixel in the mask by an estimated magnitude of the spatial gradient of the binary image 126 at that pixel. It will be understood that other image filter operators such as Sobel operator, Canny operator, Prewitt operator, etc. can also be used to create the mask.

The area identification module 200 then determines a coarse area in the mask that includes the 2-D barcode using a series of centre of gravity or centroid computations. For this, the area identification module computes the centre of gravity pixel (c) in the mask based on the edge points present in the mask. A rectangle is then initialized with the pixel c as the centre of the rectangle. In one embodiment, a size of 32×32 pixels is used. The number of edge points within the rectangle (n) and the percentage of edge points within the rectangle (p) are computed. To find a better position c, the window is shifted to above, below, left and right by one pixel, respectively, and a percentage of edge points is computed for each shifted window. That is, edge point percentages of four rectangles (centered at the four candidate c points and of the same size as the original rectangle) are respectively calculated. A rectangle with the maximum computed percentage of edge points is chosen, and its center of gravity is the updated c. The computation of the percentages of edge points above, below, to the left and to the right of the centre of gravity c is again carried out, and the centre of gravity c is again shifted based on the computation. This process is repeated till the centre of gravity c for the rectangle does not change.

The rectangle is then enlarged by a predetermined value (in one embodiment, the side of a new rectangle is twice larger than the side of a current rectangle), and the above described process of computation of centre of gravity c is carried out for the enlarged rectangle. This process of computing a centre of gravity and enlarging the rectangle is repeated until the percentage of edge points within the rectangle (p) drops below a threshold value. In one implementation, such a threshold value is p*0.8, although other values could also be used. This provides an indication of a clear and stable drop at the moment that a rectangle grows from inside a code area to an outside silent margin/quiet zone (as compared to edge points in the code area) or low content density area, according to the 2D barcode design. The rectangular area thus identified is used as the coarse area for further processing. It will be understood that though the coarse area identified is a rectangular area, other shapes of area, such as square, circle, etc. can also be used. In view of the above, exemplary operations of this particular procedure that are executed in turn and iteratively include, for example, shift the position of the rectangle and enlarge the size of the rectangle. This provides for locating a rectangle bounding the barcode area by growing a seed rectangle. Because the algorithm is a local operator, the iteration allows for obtaining a stable status (a global optimal solution).

The barcode corners detection module (corners detection module) 202 uses the coarse area for computing the 2-D barcodes' quadrangle. For this, the barcode detection module detects a region having the largest connected edge points within the coarse area in the mask. This region corresponds to the quadrangle of the barcode. The corners detection module 202 determines equations corresponding to the edges of the quadrangle using methods known in the art. For example, Hough transform is a technique that can be used to identify the parameter(s) of a curve which best fits a set of given edge points. The corners detection module 202 can apply Hough transform to the largest connected edge points to find equations of line segments corresponding to the edges. Though Hough transform has been described as being used to compute a set of equations corresponding to line segments of the identified quadrangle, it will be understood that Hough transform can also be used to determine parametric equations for other shapes as well.

Once the equations corresponding to the edges of the quadrangle are obtained, the corners identification module 202 determines co-ordinates of the corners of the quadrangle by computing the points of intersection of the equations. The co-ordinates are then used by the barcode rectification module 122 for further processing.

Figure 2B:
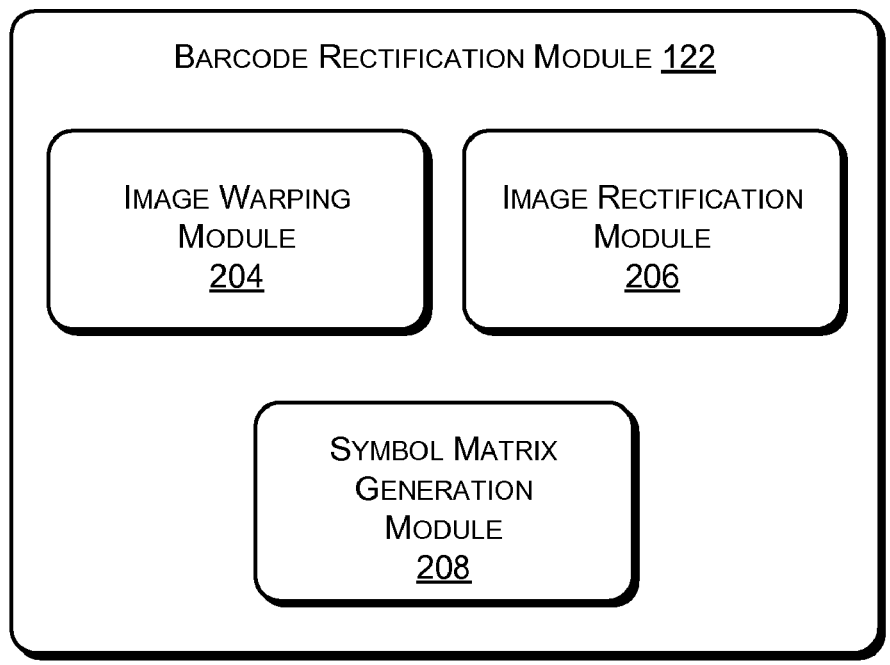
FIG. 2b illustrates an exemplary barcode rectification module for generating a barcode symbol matrix.

FIG. 2b illustrates an exemplary barcode rectification module for rectifying a barcode image and generating a barcode symbol matrix. The barcode rectification module 122 includes an image warping module 204, an image rectification module 206 and a symbol matrix generation module 208.

The image warping module 204 receives the co-ordinates of the corners of the 2-D barcode quadrangle from the barcode localization module 120. The image warping module 204 then warps the barcode quadrangle from the binary image 126 into a warped image using the co-ordinates. The warped image can be any image of regular dimensions, such as a square image. To generate the warped image, the image warping module 204 uses linear projective transformation, also referred to as homography, to project the region bounded by the co-ordinates identified by the corners detection module 202 into the warped image.

The correspondence between the identified co-ordinates and the warped image dimensions can be represented by the following equation (2):

$$\begin{bmatrix} \lambda_i u_i \\ \lambda_i v_i \\ \lambda_i \end{bmatrix} = H_{3 \times 3} \begin{bmatrix} x_i \\ y_i \\ 1 \end{bmatrix} \quad (2)$$

where, $\lambda_i$ is a constant factor for each point, $(u_i, v_i)$ are co-ordinates of pixel i that are transformed to co-ordinates $(x_i, y_i)$, and $H_{3 \times 3}$ is a homography matrix of size 3×3 that can be uniquely computed given 4 points corresponding to the 4 co-ordinates of the corners determined by the barcode localization module 120.

The image rectification module 206 can further rectify the warped image to remove effects of uneven illumination and/or pose distortion. In one implementation, the image rectification module 206 can verify whether the 2-D barcode in the warped image has undergone any rotational transformation by determining whether a predefined arrangement of pixels is present at a specified location in the warped image. For example, the image rectification module 206 can check for two lines of black pixels forming a right angle at the left bottom corner of the 2-D barcode. In case the image rectification module 206 determines that the 2-D barcode has undergone rotational changes, the image warping module 204 can rotate the warped image into another warped image with the pose rectified.

The symbol matrix generation module 208 receives the warped image from the image rectification module 206 and generates the 2-D barcode symbol matrix 130. For this, the symbol matrix generation module 208 can divide the warped image into cells and count the number of black pixels in each cell. Symbols can then be used in each cell to represent the count of black pixels in that cell. The symbols used can be for example, a binary digit (1 if no black pixels are present in a cell and 1 if black pixels are present in a cell), a dot of different sizes based on the number of black pixels in the cell, a color, a ring, etc. The symbols used to represent the 2-D barcode data can be chosen based on the symbol recognizer used to read the 2-D barcode symbol matrix 130.

An Exemplary Dataflow

Figure 3:
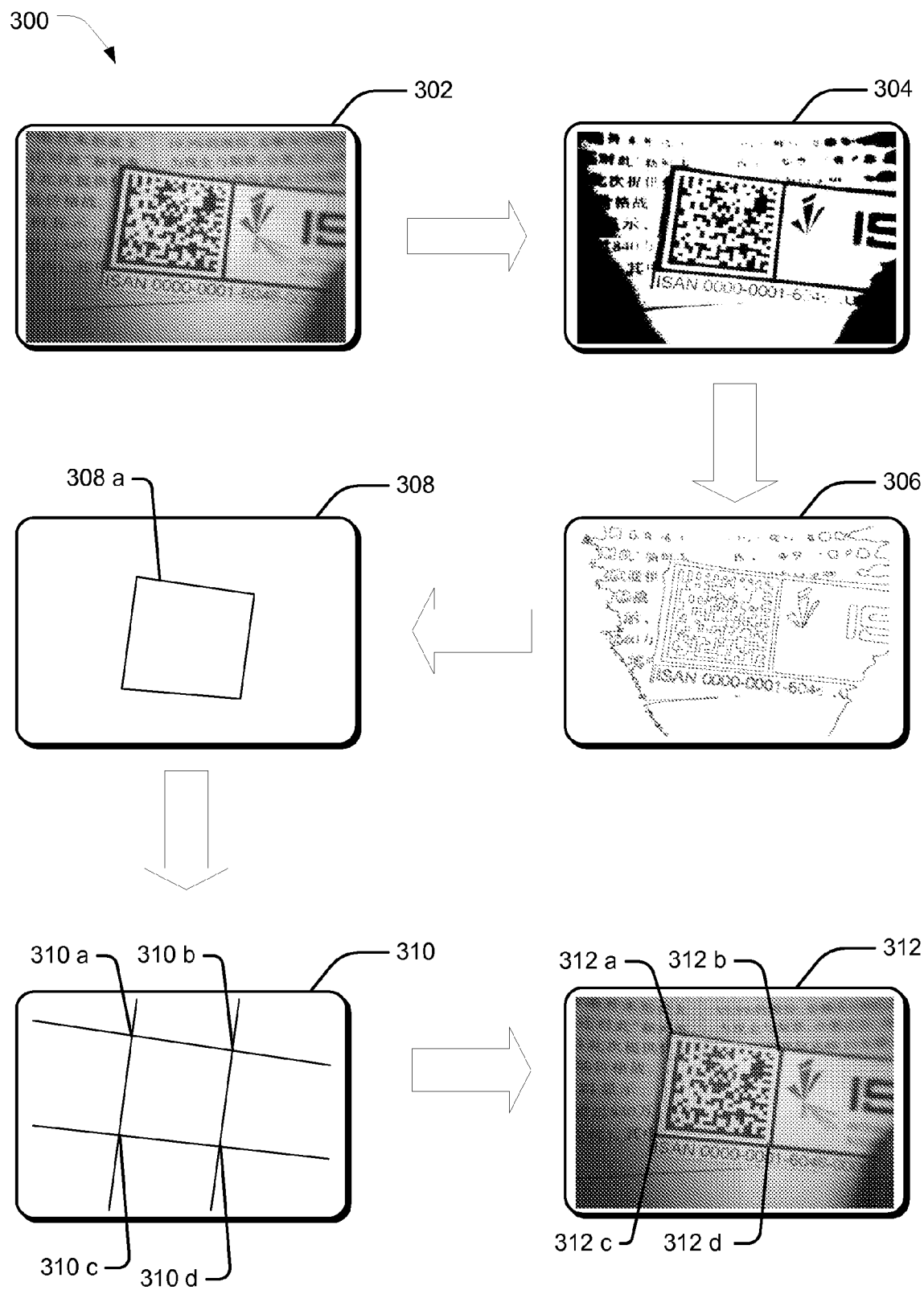
FIG. 3 illustrates exemplary dataflow for barcode localization, according to one embodiment.

FIG. 3 illustrates exemplary dataflow for barcode localization, according to one embodiment. In one implementation, the image processing module 118 can generate a uniformly illuminated image 302 by applying an illumination compensation technique to an input image 116 received from an image capturing device 112. If the input image 116 is a color image, the image processing module 118 can convert the input image 116 into a grayscale image by methods known in the art and then process the grayscale image into a uniformly illuminated image 302 by applying illumination compensation techniques known in the art. The illumination compensation techniques can be used to remove shadows and regularize image intensities in the grayscale image.

The uniformly illuminated image 302 can be converted into a binary image 304 by the image processing module 118 using image segmentation and pixel intensity comparison with a threshold. The image processing module 118 can then use one or more image filters, such as a Robert filter, to convert the binary image 304 into a mask image 306.

The barcode localization module 120 then identifies a coarse area in which the 2-D barcode can be present using a series of centre of gravity computations The barcode localization module 120 can locate the exterior quadrangle of the 2-D barcode as the largest connected edge points in the coarse area. The located quadrangle is shown as quadrangle 308a in block 308. By applying Hough transform to the located quadrangle, the corners of the 2-D barcode can be identified by the barcode localization module 120 as shown in block 310. Thus the barcode localization module 120 can identify corners of the barcode quadrangle 308a as 310a, 310b, 310c, and 310d, and correspondingly the corners of the 2-D barcode in the image 312 as 312a, 312b, 312c, and 312d respectively.

Figure 4:
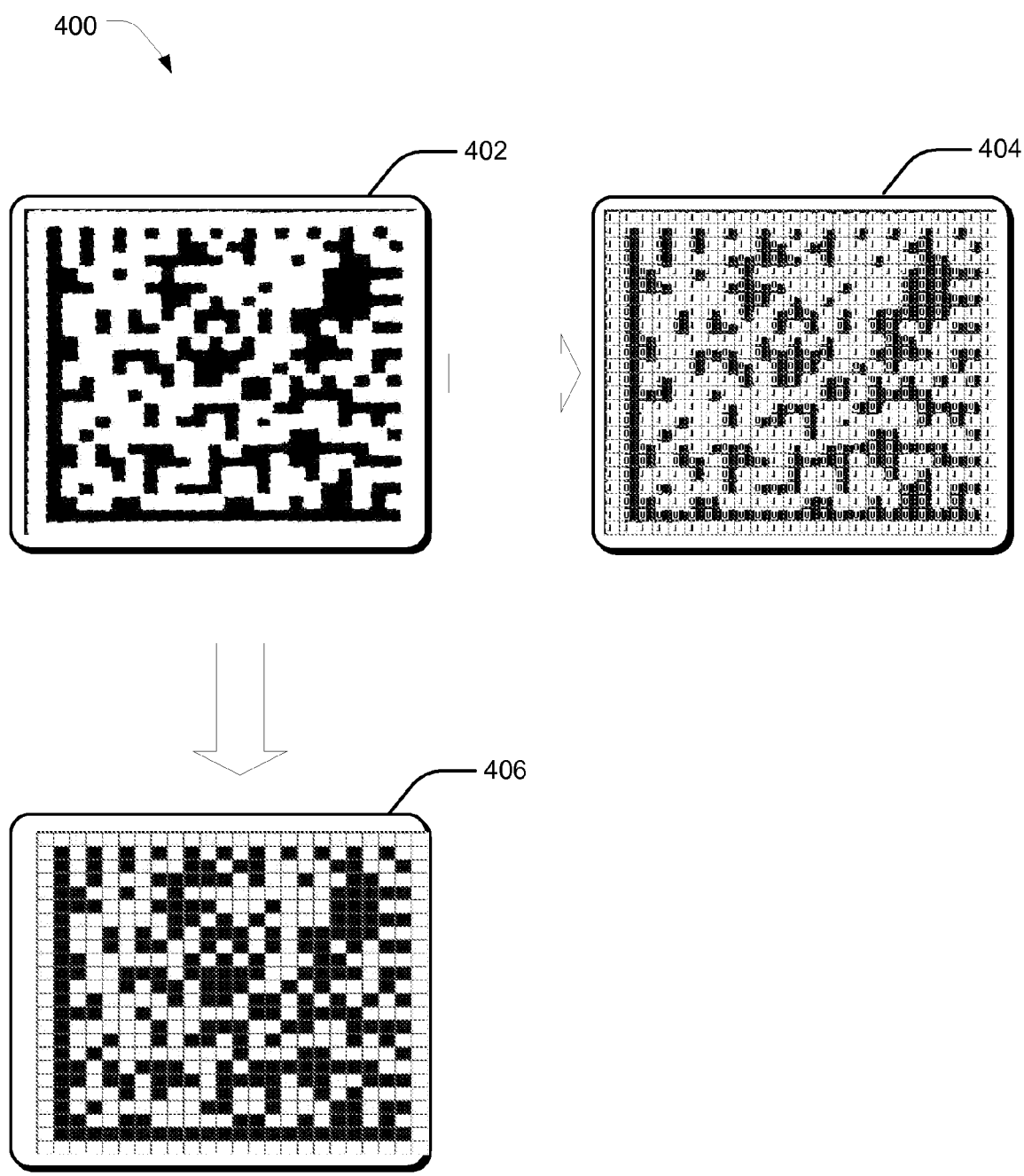
FIG. 4 illustrates exemplary dataflow for barcode symbol matrix generation, according to one embodiment.

FIG. 4 illustrates exemplary dataflow for barcode symbol matrix generation, according to one embodiment. The quadrangle image 312 obtained by the barcode localization module 120 can be warped into a square image by the barcode rectification module 122 and can be further rectified to remove pose/perspective distortions, and various illumination irregularities by methods known in the art to produce the warped image 402. The barcode rectification module 122 can then generate the 2-D barcode symbol matrix 130 from the warped image. In one implementation, the barcode symbol matrix 130 can be a barcode symbol matrix 404 generated from the warped image 402 using the symbol matrix generation module 208. In such an implementation, the barcode symbol matrix 404 has equal sized data cells, where each data cell is set as either binary 1 or binary 0. In another implementation, the barcode symbol matrix 130 can be a barcode symbol matrix 406 generated from the warped image 402 using a symbol matrix generation module 208. In such an implementation, the barcode symbol matrix 406 has equal sized data cells, where each data cell is composed of either black pixels or white pixels.

Figure 5:
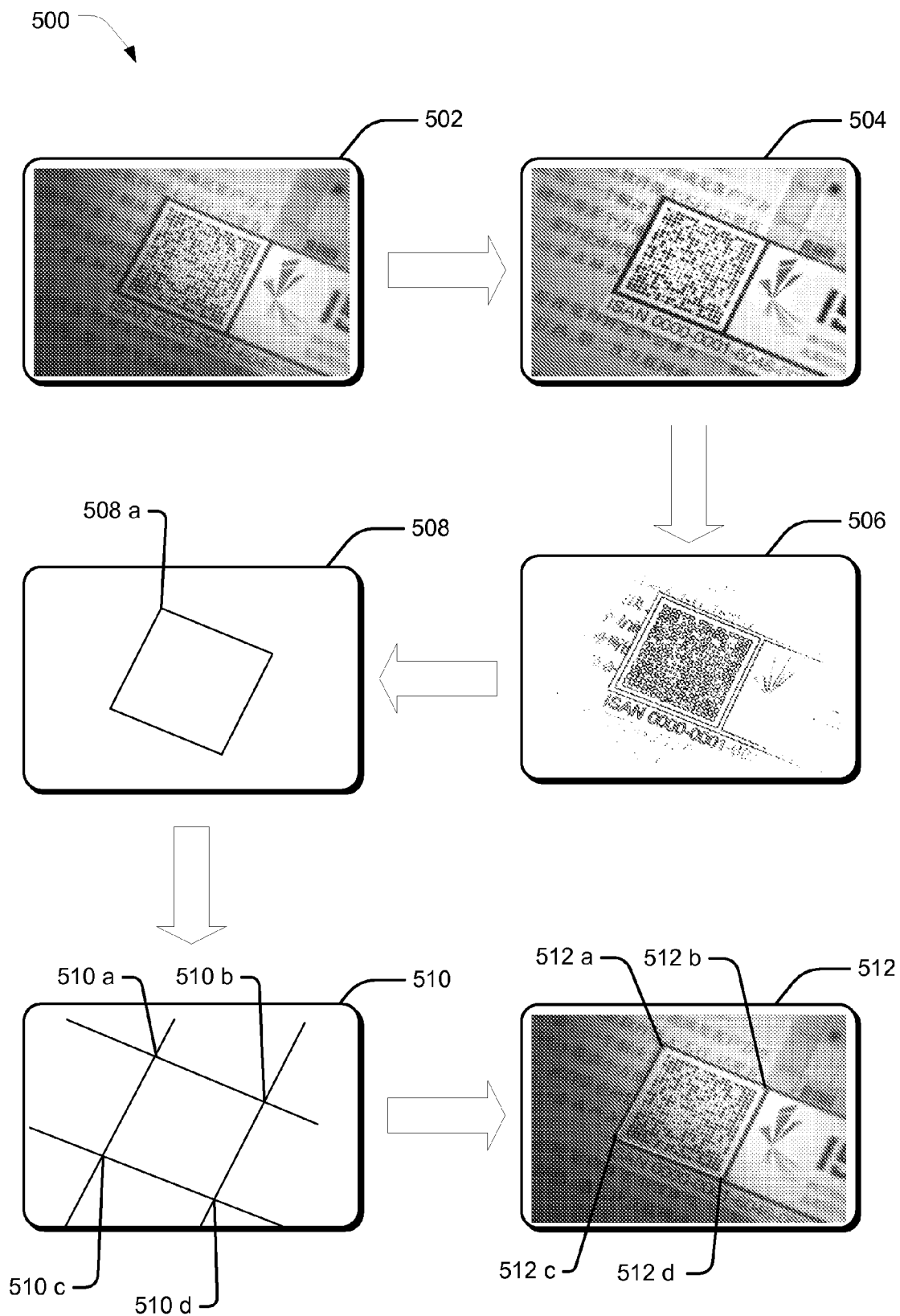
FIG. 5 illustrates exemplary dataflow for barcode localization, according to another embodiment.

FIG. 5 exemplary dataflow for barcode localization, according to another embodiment. In one implementation, the input image 116 can be an input image 502 captured by the image capturing device 114. The input image 502 can be a color image, which can be converted into a grayscale image by methods known in the art. Illumination compensation techniques can be applied to the grayscale image by the image processing module 118 to create a uniformly illuminated image 504. The uniformly illuminated image 504 can be converted into a mask 506 by the image processing module 118 using image filters, such as a Robert filter. The barcode localization module 120 can identify the area surrounded by the largest connected edge points in the mask as the area including the 2-D barcode. The identified area is shown as quadrangle 508a in block 508.

Block 510 illustrates the corners 510a, 510b, 510c, and 510d, of the 2-D barcode quadrangle 508a as identified by the barcode localization module 120. Using the identified corners, the barcode localization module 120 obtains the corner points 512a, 512b, 512c, and 512d respectively of the 2-D barcode in the binary and grayscale images as shown in the image 512.

Figure 6:
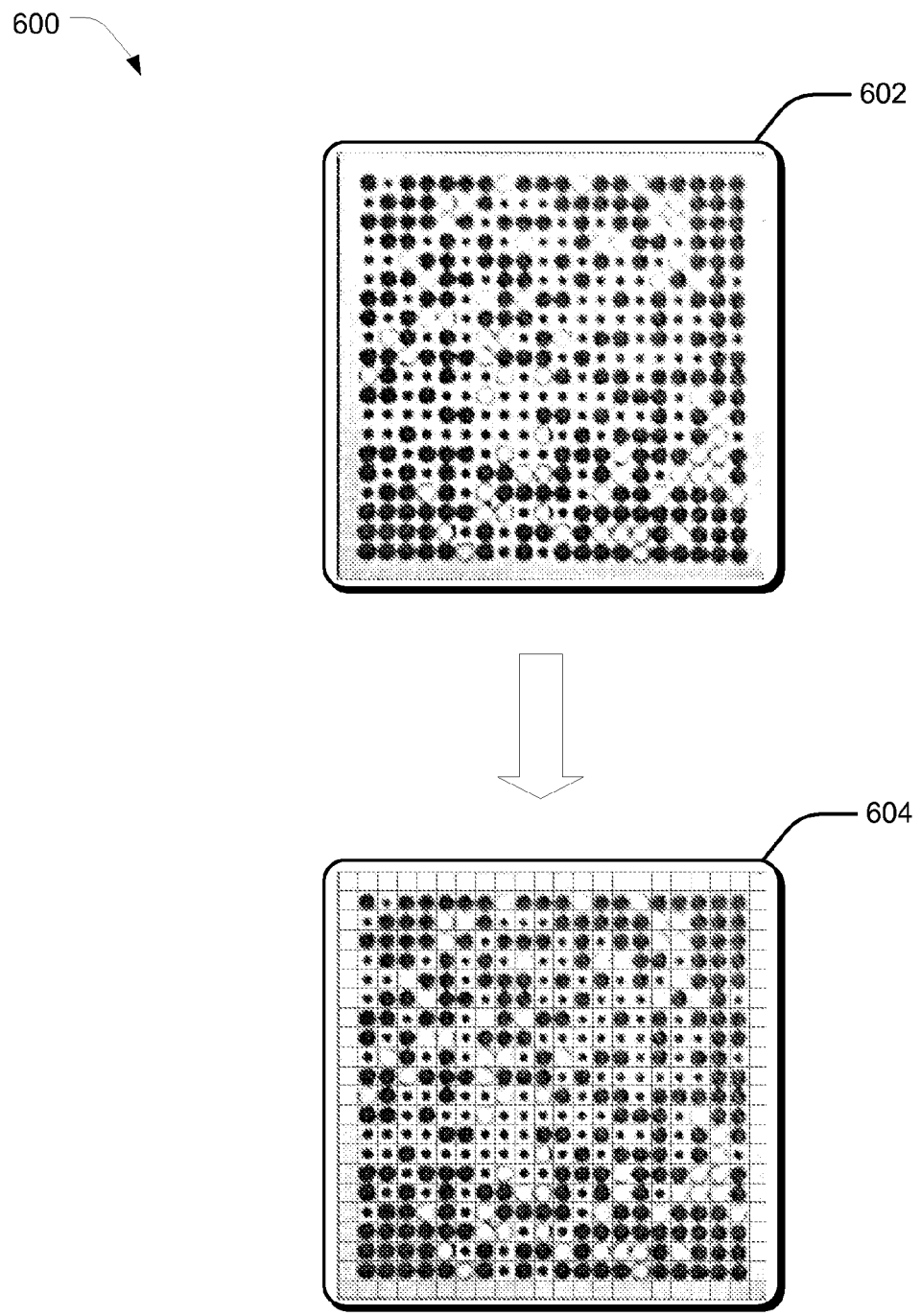
FIG. 6 illustrates exemplary dataflow for barcode symbol matrix generation, according to another embodiment.

FIG. 6 illustrates exemplary dataflow for barcode symbol matrix generation, according to another embodiment. The quadrangle image 512 obtained by the barcode localization module 120 can be warped into a square image by the barcode rectification module 122 to remove pose and/or perspective distortion and various illumination irregularities by methods known in the art to produce a warped image 602. In one implementation, the barcode symbol matrix 130 can be a barcode symbol matrix 604 generated from the warped image 602 by the barcode rectification module 122. In such an implementation, the barcode symbol matrix 604 has equal sized data cells where each data cell includes a symbol selected from a large dot, a small dot or a ring based on the number of black pixels present in the cell.

Exemplary Processes

Exemplary methods of 2-D Barcode recognition are described below. Some or all of these methods may, but need not, be implemented at least partially by an architecture such as that shown in FIG. 1-6. Also, it should be understood that certain acts in the methods need not be performed in the order described, may be modified, and/or may be omitted entirely, depending on the circumstances.

An Exemplary Barcode Recognition Method

Figure 7:
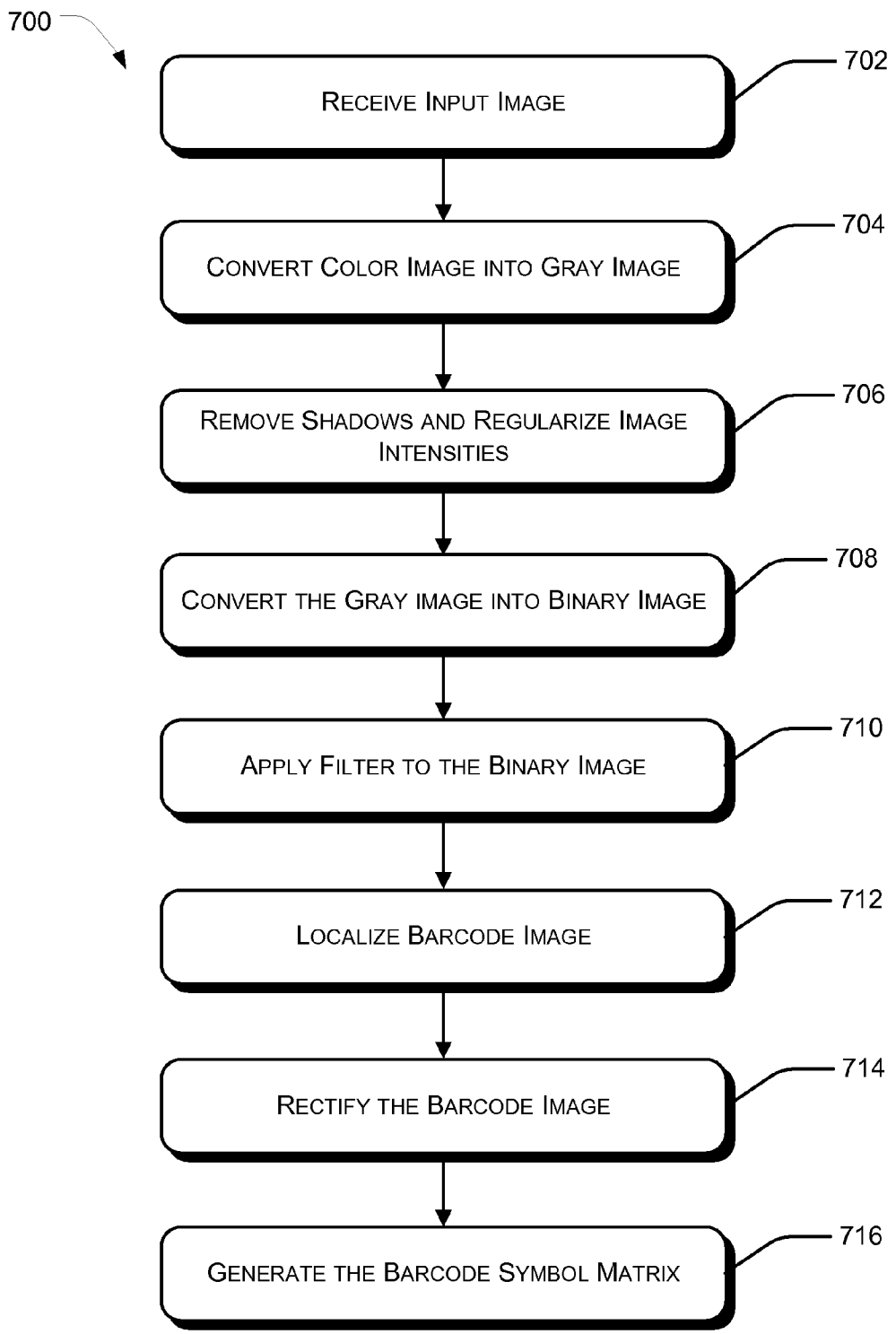
FIG. 7 illustrates an exemplary method for 2-D barcode symbol matrix generation.

FIG. 7 illustrates an exemplary method 700 for 2-D Barcode recognition. The order in which the exemplary method 700 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 702, the input image 116 is received from the image capturing device 114. The image capturing device 114 can be a linear CCD camera, a web camera, or a mobile phone camera, etc. At block 704, the input image 116 is converted into a grayscale image. In one implementation, the conversion of the image 116 can be performed using the equation (1) given above. At block 706, illumination compensation techniques are applied on the gray image to reduce illumination irregularities. The illumination compensation techniques can be used to remove shadows, compensate for non-uniform lighting, and stretch illumination intensities of the grayscale image so that the intensities fall within the range 0-255.

At block 708, the uniformly illuminated grayscale image, such as image 302 is converted into a binary image, such as the image 304. The binary image is a black and white image obtained by image segmentation and threshold comparison techniques. The image segmentation technique divides the grayscale image into four parts and a segmentation threshold for each part is computed by methods known in the art. In one implementation, segmentation threshold can be computed in the following manner. It can be assumed that in each part of the grayscale image, the black pixels correspond to the background and white pixels correspond to the foreground. For each part of the grayscale image, one pixel can be picked up from the background and another pixel can be picked up from the foreground. The median or the midpoint of the pixel intensities of these two pixels can be taken to be the segmentation threshold for that part of the gray image. The segmentation threshold of each part can be then compared with the pixel intensity of each pixel in the respective part of the gray image. If the pixel intensity is higher than the segmentation threshold, the pixel can be set as a white pixel in the output binary image 304. If the pixel intensity is lower than the segmentation threshold, the pixel can be set as a black pixel in the output binary image 304.

At block 710, an image filter can be applied to the binary image to get the mask image 306. For example, a Robert filter can be applied to the binary image. The Robert filter uses an operator referred to as Robert Cross operator having a pair of two-dimensional (2×2) convolution kernels, where one kernel is obtained by rotating the other kernel by an angle of 90 degrees. Each kernel corresponds to edges running at an angle of 45 degrees to a pixel grid; one kernel for each of the two perpendicular orientations. Each kernel is applied to the pixel grid in the binary image 304, to produce an individual measurement of gradient component in each orientation of the kernel. The individual measurements are then combined to get the final magnitude and orientation of the gradient components. The final magnitude of each pixel grid in the binary image corresponds to the edge points represented by black pixels in the mask, such as image 306.

At block 712, the barcode localization module 120 computes the largest connected edge points in the mask image 306 and locates the barcode corners 310a, 310b, 310c, and 310d of the barcode rectangle 308a. At block 714, the barcode rectification module 122 locates the corresponding corner points of the 2-D barcodes' quadrangle in the binary image and warps the quadrangle image 312 into a square image. The barcode rectification module 122 further rectifies the square image by removing uneven illumination and pose distortion to produce the warped image 402. At block 716, the barcode rectification module 122, generates a 2-D barcode symbol matrix from the warped image 402. For this, the warped image 402 is divided uniformly into data cells. In one implementation, each data cell is set to 1 if the data cell has white pixels and set to 0 if the data cell has black pixels, to obtain a 2-D barcode symbol matrix 404. In another implementation, each data cell is set to a large dot, a small dot or a ring depending on the number of black pixels in each data cell. The 2-D barcode symbol matrix 404 thus generated can be presented to a user, or can be used by the symbol recognition module for data processing.

An Exemplary Barcode Localization Method

Figure 8:
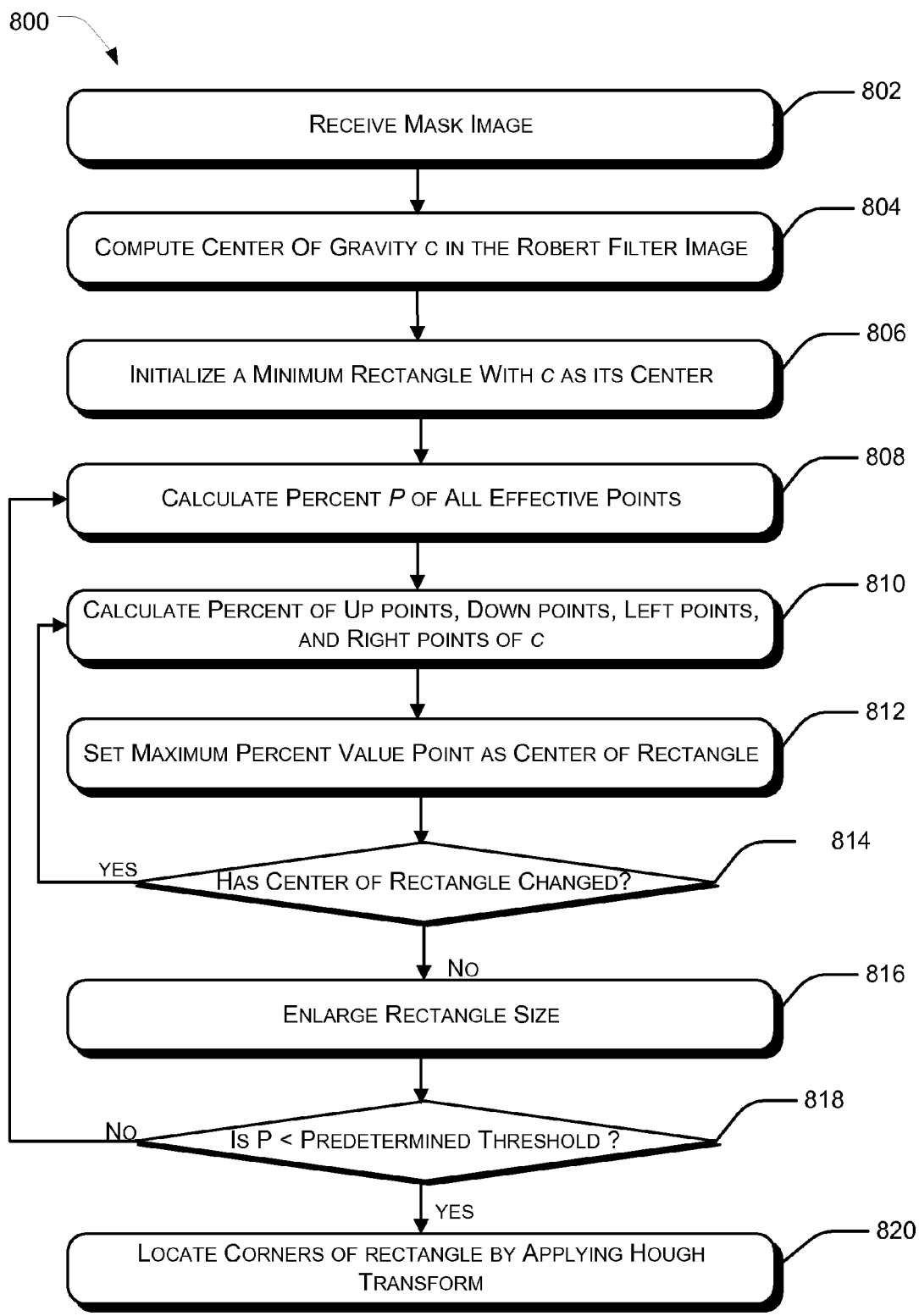
FIG. 8 illustrates an exemplary method for localizing a barcode in an image.

FIG. 8 shows the exemplary barcode localization method 800 performed by the barcode localization module 120. The barcode localization method 800 uses a barcode area identification module 200 to identify a region bound by the largest connected edge points which includes the 2-D barcode. Further, the barcode corners detection module 202 is used to detect corners of the 2-D barcode quadrangle. The barcode localization method 800 is described below in detail. At block 802, the barcode area identification module 200 receives the mask image as the input image. At block 804, a center of gravity c is computed for the mask image 306 based on the number and location of the edge points.

At block 806, a minimum sized rectangle is initialized with the center of gravity c as the center of the rectangle. At block 808, a percentage p of all edge points within the rectangle is computed. At block 810, percentages of edge points that are present above, below, to the left and to the right of the center c of the rectangle are calculated. At block 812, a maximum percentage value point is set as the center c of the rectangle. As described above, for example, a percentage value is calculated by shifting an original rectangle in a direction of multiple directions by one point unit. This value is assigned to the shifted center position. This is repeated for the other directions. Then one of the four candidate new center point positions, that of the maximum value is selected.

At block 814, it is determined whether the center c of the rectangle has changed or not. If the center c of the rectangle has changed (i.e. the "yes" branch from block 814), then the method 800 moves from block 812 to block 810 and the process of finding a new centre of gravity point is repeated. If the center c of the rectangle has not changed (i.e. the "no" branch from block 814), then the method 800 moves from block 812 to block 816. At block 816, the rectangle is enlarged in size by a predetermined value. At block 818, it is determined whether the value of p in the enlarged rectangle drops below a predetermined threshold value (e.g., p*0.8, or other thresholds). If the value does not drop below the predetermined threshold value (i.e. the "no" branch from block 818), then the method 800 moves from block 816 to block 808 to determine the centre of gravity for the enlarged rectangle. If the value of p drops below the predetermined threshold value (i.e. the "yes" branch from block 818), then the method 800 moves from block 816 to block 820.

At block 820, a quadrangle corresponding to the largest connected edge points within the rectangular region identified at the previous block is located. Hough transform is applied to the edge points bounding the quadrangle to compute equations corresponding to the edges of the quadrangle. The equations can be solved to determine points of intersection corresponding to the corners of the 2-D barcode. Thus the 2-D barcode quadrangle can be localized and co-ordinates of the corners of the 2-D barcode quadrangle can be obtained.

An Exemplary Barcode Rectification Method

Figure 9:
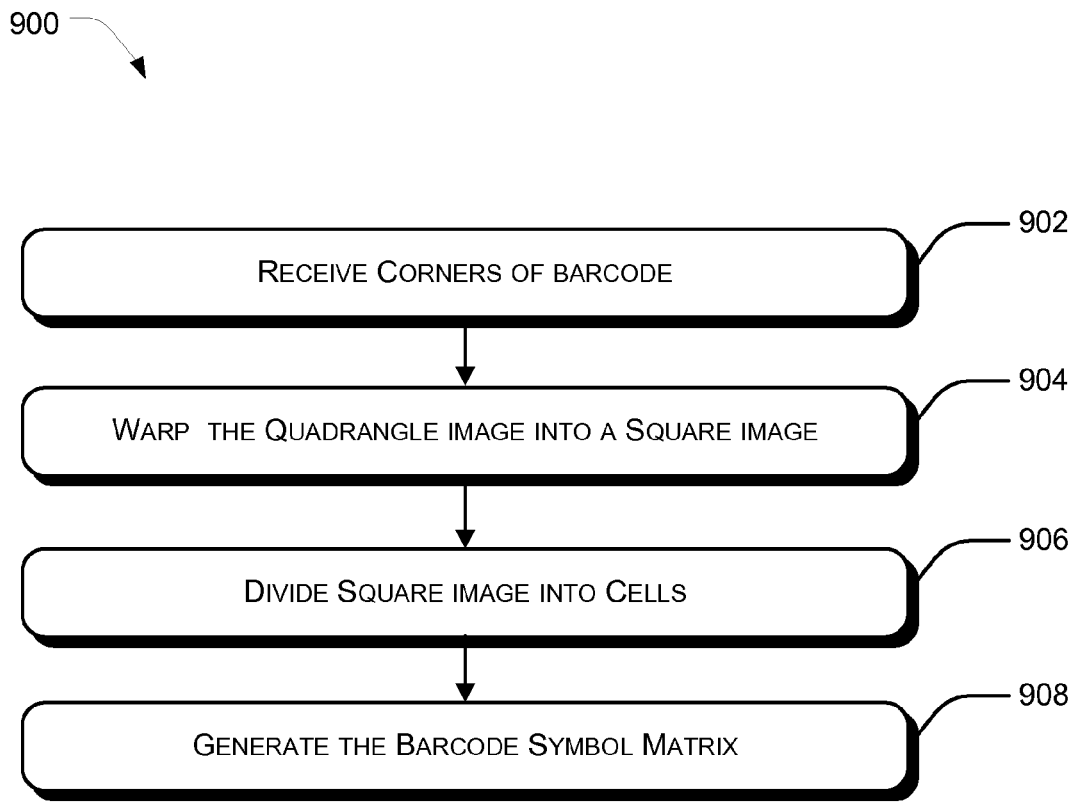
FIG. 9 illustrates an exemplary method for generating a barcode symbol matrix from a localized barcode.

FIG. 9 illustrates an exemplary method for generating a barcode symbol matrix from a localized barcode. At block 902, the barcode rectification module 122 receives co-ordinates of the corners of the 2-D barcode from the barcode corners detection module 202. At block 904, the image warping module 204 of the barcode rectification module 122 warps the quadrangle image into a warped image using homographic techniques. The Homographic transformation removes pose and perspective distortions to generate the 2-D barcode symbol matrix. The homographic transformation is a one-to-one correspondence between the quadrangle image and the warped image projected on a plane. The projective plane has three homogenous coordinates and so the homographic transformation is represented by a 3×3 matrix H with eight independent parameters. The correspondences can be represented by equation (2) given above. The equation (2) can be solved using the co-ordinates of the four corner points obtained by the barcode localization module 120 to compute the transformation parameter $H_{3\times3}$. The warping of the quadrangle image to the warped image S can be represented as H→S.

At block 906, the symbol matrix generation module 208 receives the warped image from the block 904 and divides the warped image into equal-sized squares referred to as data cells. At block 908, a barcode symbol matrix is generated by the symbol matrix generation module 208 by representing the count of black pixels in each cell by a symbol. In one implementation, a data cell can be represented by black pixels, or by white pixels. The data cell represented by white pixels can also be set to binary 1 and the data cell represented by black pixels can also be set to binary 0. In another implementation, the number of black pixels in each data cell is counted to choose a barcode symbol such as a large dot, a small dot or a ring. The barcode symbol matrix thus generated can be sent as input to a symbol recognition module for data recognition that can present information associated with the barcode symbol matrix to a user, or cause other arbitrary actions to be performed.

Any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Communication media typically embodies computer-readable instructions, data structures, program modules or other data on any information delivery media. Combinations of the any of the above should also be included within the scope of computer-readable media.

CONCLUSION

Although the invention has been described in language specific to structural features and/or methodological acts for implementing an exemplary method for 2-D barcode recognition, it is to be understood that the invention is not necessarily limited to the specific features or acts described. Rather, the specific features and acts are disclosed as exemplary forms of implementing the invention.

What is claimed is:

1. A method implemented at least in part by a computing device, the method comprising:
   receiving an input image comprising a 2-Dimensional (2-D) barcode;
   processing the input image to obtain a binary image, wherein the processing comprises compensating for illumination variation;
   identifying an area in the binary image as containing the 2-D barcode;
   transforming the area in the binary image into a warped image; and
   generating a 2-D barcode symbol matrix from the warped image for processing and presentation of associated information to a user.

2. The method of claim 1, wherein the receiving comprises receiving the input image from an image capturing device.

3. The method of claim 1, wherein the processing further comprises converting the input image from a color image to a grayscale image.

4. The method of claim 1, wherein the compensating for illumination variation comprises at least one of removing shadows, enhancing contrast, and stretching image intensity.

5. The method of claim 1, wherein the identifying comprises:
   converting the binary image into a mask using one or more image filters, wherein the mask comprises edge points;
   detecting a region in the mask, wherein the region comprises the most connected edge points; and
   locating the area in the binary image, wherein the area in the binary image corresponds to the region in the mask.

6. The method of claim 5, wherein the image filter identifies edges in the binary image.

7. The method of claim 5, wherein the locating comprises computing equations for edges bounding the area using Hough transform.

8. The method of claim 1 wherein the transforming the area comprises correcting perspective distortion using a homograph.

9. The method of claim 8, wherein the transforming further comprises determining whether the area is rotationally distorted.

10. The method of claim 1, wherein the generating the 2-D barcode symbol matrix comprises:
    dividing the warped image into cells;
    counting a number of black pixels in a cell; and
    representing the number as a symbol in the cell.

11. The method of claim 10, wherein the symbol is selected from a binary digit, a color, a dot and a ring.

12. A computing device comprising:
    one or more processors; and
    a memory, the memory comprising computer-program instructions executable by the processor, the computer-program instructions including a barcode localization module and a barcode rectification module, the barcode localization module being configured to locate a 2-D barcode in a binary image, the barcode rectification module being configured to generate a 2-D barcode symbol matrix for input into a symbol recognition module that presents corresponding information to a user, the 2-D barcode symbol matrix being generated from a warped image of the 2-D barcode.

13. The computing device of claim 12 wherein the computer-program instructions further comprise instructions for an image processing module configured to perform acts comprising:
    compensating for illumination variation in an input image; and
    converting the input image into the binary image.

14. The computing device of claim 12, wherein the barcode localization module is further configured to perform acts comprising:
    converting the binary image into a mask using one or more image filters; and
    identifying an area in the mask, wherein the area corresponds to the 2-D barcode.

15. The computing device of claim 14, wherein the barcode localization module is configured to identify the area in the mask by performing acts comprising:
    computing a center of gravity of edge points in the mask;
    defining a rectangular area of initial proportions on the mask, the center of gravity being a center of the rectangular area; and
    iteratively calculating respective edge point percentages in multiple directions from the center of gravity to change dimensions of the rectangular area and the center of gravity until the respective edge point percentages correspond to a predetermined threshold value, wherein the area is the rectangular area when the respective edge point percentages correspond to the predetermined threshold value.

16. The computing device of claim 12, wherein the 2-D barcode symbol matrix comprises of one or more symbols selected from a binary digit, a color, a dot of variable size and a ring.

17. A computer-readable data storage medium having a set of computer readable instructions that, when executed by a processor, perform acts comprising:
    locating a 2-D barcode in a binary image, wherein the binary image is obtained by transformation of an input image;
    converting the 2-D barcode in the binary image into a warped image by homography; and
    dividing the warped image into cells for generating a 2-D barcode symbol matrix for processing and presentation of associated information to a user, wherein the generating comprises:
    counting a number of black pixels in a cell; and
    representing the number as a symbol in the cell.

18. The computer-readable data storage medium of claim 17, wherein the transformation of the input image comprises:
   converting a color image into a grayscale image; and
   compensating for illumination variation in the grayscale image.

19. The computer-readable data storage medium of claim 17, wherein the input image is received from at least one of a CCD camera, a web camera, and a camera associated with a phone.

20. The computer-readable data storage medium of claim 17, wherein the locating the 2-D barcode comprises:
   converting the binary image into a mask using one or more image filters; and
   detecting an area in the mask, wherein the area corresponds to the 2-D barcode.

* * * * *